(12) United States Patent
Schaeffer

(10) Patent No.: US 11,976,681 B2
(45) Date of Patent: May 7, 2024

(54) SCREW NUT WITH BARCODE PATTERN SEGMENTS

(71) Applicant: Hilti Aktiengesellschaft, Schaan (LI)

(72) Inventor: Marc Schaeffer, Altendorf (CH)

(73) Assignee: Hilti Aktiengesellschaft, Schaan (LI)

( * ) Notice: Subject to any disclaimer, the term of this patent is extended or adjusted under 35 U.S.C. 154(b) by 308 days.

(21) Appl. No.: 17/624,074

(22) PCT Filed: Jun. 23, 2020

(86) PCT No.: PCT/EP2020/067500
§ 371 (c)(1),
(2) Date: Dec. 30, 2021

(87) PCT Pub. No.: WO2021/001214
PCT Pub. Date: Jan. 7, 2021

(65) Prior Publication Data
US 2022/0356889 A1 Nov. 10, 2022

(30) Foreign Application Priority Data
Jul. 3, 2019 (EP) ..................................... 19184200

(51) Int. Cl.
*F16B 37/00* (2006.01)
*G06K 19/06* (2006.01)

(52) U.S. Cl.
CPC ........ *G06K 19/06121* (2013.01); *F16B 37/00* (2013.01); *F16B 2200/95* (2023.08)

(58) Field of Classification Search
CPC .......... F16B 1/00; F16B 1/0071; F16B 31/02; F16B 31/028; F16B 37/00; F16B 2200/95; G06K 19/06121

USPC ................................................ 411/8, 13, 427
See application file for complete search history.

(56) References Cited

U.S. PATENT DOCUMENTS

| 524,895 | A | * | 8/1894 | Fulton | F16B 31/02 411/932 |
| 1,156,798 | A | * | 10/1915 | Meaker | F16B 37/00 470/87 |
| 3,153,974 | A | * | 10/1964 | Canning | F16B 31/028 73/796 |
| 5,358,367 | A | * | 10/1994 | Yang | F16B 35/005 411/397 |
| 5,375,955 | A | * | 12/1994 | Leslie | F16B 2200/95 411/378 |

(Continued)

FOREIGN PATENT DOCUMENTS

DE 10 2021 106 817 A1 12/2021
EP 2 058 530 B1 5/2009
(Continued)

OTHER PUBLICATIONS

PCT/EP2020/067500, International Search Report dated Sep. 21, 2020 (Two (2) pages).
(Continued)

*Primary Examiner* — Roberta S Delisle
(74) *Attorney, Agent, or Firm* — Crowell & Moring LLP

(57) ABSTRACT

A screw nut includes a through hole defined by the screw nut, an internal thread that projects into the through hole, and a face that surrounds the through hole. At least three barcode patterns are disposed on the face where the at least three barcode patterns have an identical content.

11 Claims, 1 Drawing Sheet

(56) References Cited

U.S. PATENT DOCUMENTS

| | | |
|---|---|---|
| 6,843,628 B1 | 1/2005 | Hoffmeister et al. |
| 10,165,340 B2 | 12/2018 | Tillotson et al. |
| 2002/0033267 A1 | 3/2002 | Schweizer et al. |
| 2004/0065154 A1 | 4/2004 | Kibblewhite |
| 2004/0067120 A1 | 4/2004 | Speer |
| 2010/0054891 A1* | 3/2010 | Nishida ............... B25B 23/14 73/761 |
| 2010/0155380 A1 | 6/2010 | Blackall et al. |
| 2012/0192388 A1* | 8/2012 | Demerath ............ F16B 21/065 29/525.01 |
| 2014/0345110 A1 | 11/2014 | Schmidt et al. |
| 2015/0285291 A1* | 10/2015 | Kopp ..................... F16B 37/00 411/378 |
| 2017/0039407 A1 | 2/2017 | Flick |
| 2018/0291945 A1* | 10/2018 | Turner ................. F16B 31/028 |

FOREIGN PATENT DOCUMENTS

| | | |
|---|---|---|
| EP | 3 564 540 A1 | 11/2019 |
| JP | 2006-64585 A | 3/2006 |
| JP | 2009-107114 A | 5/2009 |

OTHER PUBLICATIONS

Bergamasco et al., "Rune-tag: A High Accuracy Fiducial Marker with Strong Occlusion Resilience", *Computer Vision and Pattern Recognition (CVPR), 2011 IEEE Conference*, pp. 113-120, Jun. 2011.

* cited by examiner

SCREW NUT WITH BARCODE PATTERN SEGMENTS

BACKGROUND AND SUMMARY OF THE INVENTION

The invention relates to a screw nut. Such a screw nut comprises a through hole, an internal thread that projects, in particular laterally projects, into the through hole, a first face that surrounds the through hole, and at least one first barcode pattern that is located on the first face.

EP2058530 B1 discloses an installation system for screw nuts and bolts that are each marked with code. The code may provide supplier identification, part number, lot number, batch number, material, type (which may include size), date, and other types of information. In particular, the code may be applied to a rear face of the respective screw nuts.

European patent application having application number 18170569.0 proposes to place an optically readable code at the rear face of the anchor bolt of an expansion anchor, wherein the expansion anchor has at least one code protection protrusion, which projects, from the anchor bolt, rearwardly beyond the optically readable code, in order to protect the optically readable code from hammer blows.

US2014345110 A1 describes an expansion anchor of the undercut type. The expansion anchor has a marking on its anchor bolt, which becomes visible when the anchor bolt is moved relative to the expansion sleeve during installation. Furthermore, the anchor bolt can be provided with an optically readable code on its rear face, which allows to identify the expansion anchor.

US2004065154 A1 mentions a two-dimensional barcode that is marked on a screw fastener with a laser or on a label applied to the screw fastener.

U.S. Pat. No. 6,843,628 B1 discloses a fixing device, e.g., a screw fastener or a nut, comprising an externally readable information storage element, the information storage element being configured to be machine-readable and containing optically readable information, wherein the information storage element comprises at least one of a two-dimensional and a three-dimensional optically readable code.

US2002033267 A1 shows an electrical hand-held power tool, comprising a transceiver for reading-in identification data contained in identification means associated with at least one fastening element. The identification means can be a bar code.

F. Bergamasco, A. Albarelli, E. Rodola, and A. Torsello, "Rune-tag: A high accuracy fiducial marker with strong occlusion resilience", in IEEE Conference on Computer Vision and Pattern Recognition (CVPR), 2011, pages 113-120, describes ring-shaped marker patterns.

It is an object of the invention to provide a data-containing screw nut that has particularly high versatility and allows particularly easy optical data read-out whilst being particularly reliable and easy to manufacture.

According to the invention, the screw nut comprises at least three first barcode patterns that are located on the first face, wherein the first barcode patterns have identical content, namely data content.

The invention is based on the finding that when a screw nut is installed on a threaded rod, the threaded rod potentially obstructs the view on the nut faces, potentially requiring cumbersome alignment of a barcode reader if the barcode is placed on a face of the screw nut. Based on this finding, the invention proposes to replicate the barcode pattern on the respective face. In particular, it is proposed to provide at least three first barcode patterns with identical data content on the same nut face, namely on the first face. Accordingly, it is possible to arrange the barcode patterns to give particularly good accessibility. In particular, it can be possible to arrange the barcode patterns in such a way that at least one barcode is completely accessible at most top viewing angles, allowing particularly high versatility and particularly easy data access. Since the barcodes are provided on a nut face instead of a threaded rod, they are also particularly well protected from mechanical damage, e.g., during installation, and particularly easy to apply, thereby facilitating manufacturing.

The first face, on which the first barcode patterns are located, is ring-shaped and surrounds the through hole. The screw nut can for example be used to attach an attachment part to a threaded rod. Preferably, the first face faces away from the attachment part. The screw nut can also have a second face surrounding the through hole. This second face can act against the attachment part. The screw nut can have drive surfaces for driving tool engagement. For example, the screw nut can be a hex nut, in which case it has six drive surfaces. The drive surfaces can each connect the first face with the second face.

The through hole extends along the longitudinal axis of the screw nut, in particularly the through hole is coaxial with the longitudinal axis. In particular, the longitudinal axis is the axis of the internal thread. The first face and/or the second face preferably extend at least approximately radially with respect to the longitudinal axis of the screw nut and/or the drive surfaces extend at least approximately parallel to the longitudinal axis of the screw nut.

Where reference is made to the circumferential, axial and/or radial directions, this should in particular refer to the longitudinal axis of the screw nut.

The screw nut can have additional barcode patterns. For example, the screw nut can comprise at least three second barcode patterns that are located on the second face, wherein the second barcode patterns have identical content, and wherein the content of the first and second barcode patterns is identical. This allows to attach the screw nut to the threaded rod in two alternative configurations, with the barcode information being accessible in both configurations. There can also be additional barcode patterns with different content on the nut, possibly also on the first face. In particular, each of the first barcode patterns, second barcode patterns and/or additional comprises a complete barcode.

It is particularly preferred that the first barcode patterns are identical. In this case, the first barcode patterns are the same. However, they are arranged at different positions and/or orientations.

According to a preferred embodiment of the invention, the screw nut comprises—exactly—three first barcode patterns that are located on the first face. Accordingly, there are three first barcode patterns having identical content on the first face, and not more. Thus, there is, for example, no fourth or fifth barcode pattern with this content on the first face. Using exactly three first barcode patterns allows to make the first barcode patterns particularly large while remaining accessible even when the screw nut is located on a threaded rod, thereby allowing particular reliable barcode read-out.

Preferably, the first barcode patterns are circumferentially offset. It is particularly advantageous that the first barcode patterns are arranged in circumferentially (circumferentially in particular with respect to the longitudinal axis of the screw nut) non-overlapping relation on the first face. Accordingly, the individual first barcode patterns do not overlap each other in the circumferential direction, i.e., in the direction circularly surrounding the longitudinal axis and/or the thread axis of the internal thread. In other words, there are three or more virtual sectors on the first face, the sectors originating from the longitudinal axis, and each of the first barcode patterns occupies only one of these sectors. This allows to improve barcode coverage of the first face, thereby further improving barcode readability at low effort.

Preferably, each of the first barcode patterns has a ring-segment-shaped outline. Accordingly, the outline of the first barcode patterns can follow the ring-shape of the first face, allowing a particularly high coverage of the first face and therefore a particularly good readability of the barcode patterns. The axis around which the ring segments are curved is preferably the longitudinal axis of the screw nut.

The first barcode patterns are, advantageously, equidistantly spaced. Accordingly, the distance between neighboring first barcode patterns is always the same. This can be advantageous in view of coverage and readability.

It is particularly preferred that the first barcode patterns each span an angle of 120° or less around the longitudinal axis of the screw nut. Thus, each of the first barcode patterns has an opening angle of 120° or less when seen from the longitudinal axis of the screw nut. This provides particularly good readability of the barcodes, even when the screw nut is mounted on a threaded rod.

The first barcode patterns can, for example, each comprise a one-dimensional barcode, i.e., a linear barcode, but preferably, they each comprise a two-dimensional barcode, i.e., a matrix barcode. The first barcode dimension can extend in the circumferential direction and the second barcode direction in the radial direction, both with respect to the longitudinal axis of the screw nut. In particular, the barcodes can be based upon a rune tag pattern.

The invention also comprises a fastener arrangement comprising a threaded rod and a screw nut, as described here, threadedly engaging the threaded rod, wherein the first face of the screw nut surrounds the threaded rod. Thus, the screw nut is installed as intended.

Features that are described here in connection with the inventive screw nut can also be used in connection with the inventive fastener arrangement and features that are described here in connection with the inventive fastener arrangement can also be used in connection with the inventive screw nut.

The invention is explained in greater detail below with reference to preferred exemplary embodiments, which are depicted schematically in the accompanying drawings, wherein individual features of the exemplary embodiments presented below can be implemented either individually or in any combination within the scope of the present invention.

DETAILED DESCRIPTION OF THE DRAWINGS

Figure 1:
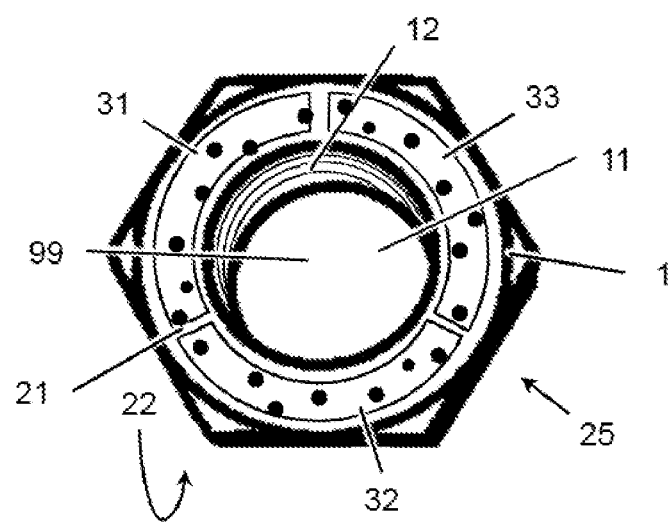
FIG. 1 is a, slightly tilted, top view of an embodiment of a screw nut.
Figure 2:
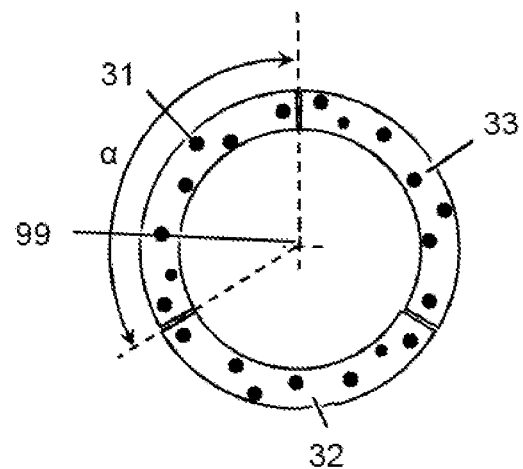
FIG. 2 is a top view of the first barcode patterns which are arranged on the screw nut of FIG. 1.
Figure 3:
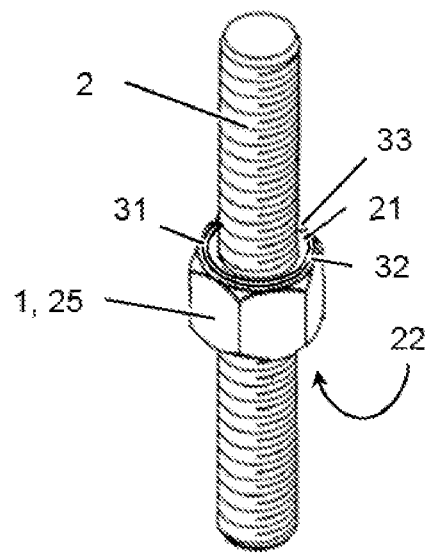
FIG. 3 is a fastener arrangement comprising the screw nut of FIG. 1.

FIGS. 1 to 3 illustrate an example of a screw nut. The screw nut 1 has a first face 21 and a second face 22, wherein the first face 21 and the second face 22 face in opposite directions. The screw nut 1 is penetrated by a through hole 11, which extends along the longitudinal axis 99 of the screw nut 1. The first face 21 is ring-shaped and surrounds the through hole 11. The second face 22 is also ring-shaped and surrounds the through hole 11. The ring-shaped first face 21, the ring-shaped second face 22 and the through hole 11 are arranged coaxially with the longitudinal axis 99. The first face 21 and the second face 22 delimit the screw nut 1 at opposite ends.

The screw nut 1 also has drive surfaces 25 for driving tool engagement that extend between the first face 21 and the second face 22. In the present embodiment, the drive surfaces 25 are flats, but they can also have more complex geometry. By way of example, the shown nut is a hex nut, thus having six drive surfaces 25 arranged in a hexagonal arrangement.

The screw nut 1 has an internal thread 12, which projects into the through hole 11 and extends along the through hole 11. The thread axis of the internal thread 12 is the longitudinal axis 99.

FIG. 3 shows a fastener arrangement comprising the screw nut 1 and a threaded rod 2. The screw nut 1 is mounted on the threaded rod 2 and the internal thread 12 of the screw nut 1 screwingly engages the external thread of the threaded rod 2.

On the first face 21 there are provided three first barcode patterns 31, 32, 33. Each of the first barcode patterns 31, 32, 33 has a ring-segment shaped outline and taken together, the first barcode patterns 31, 32, 33 form a ring that surrounds the longitudinal axis 99 in coaxial manner. The first barcode patterns 31, 32, 33 are non-overlapping in the circumferential direction, and equidistantly spaced, i.e., neighbor first barcode pattern pairs have always the same circumferential distance. In the present embodiment, the first barcode patterns 31, 32, 33 each span an angle α of approximately 120° around the longitudinal axis 99 of the screw nut 1.

Each of the first barcode patterns 31, 32, 33 comprises a barcode, a two-dimensional barcode in the present example. Although being arranged at different locations and different angles, the first barcode patterns 31, 32, 33 have identical content and are identical in the present embodiment. Thus, whichever of the first barcode patterns 31, 32, 33 is read out, this always yields the same data. The spatially distributed arrangement of the first barcode patterns 31, 32, 33 can ensure that at least one of the first barcode patterns 31, 32, 33 is completely visible from an overlaying top hemisphere, even when the screw nut 1 is mounted on the threaded rod 2 and the threaded rod 2 partly covers one or two of the first barcode patterns 31, 32, 33: In case of the fastener arrangement and the viewing angle of FIG. 3, the first barcode pattern that is labelled 33 is covered by the threaded rod 2, whereas barcode pattern 32, and preferably also barcode pattern 31, is accessible for read-out.

The invention claimed is:
1. A screw nut, comprising:
   a through hole defined by the screw nut;
   an internal thread that projects into the through hole;
   a first face that surrounds the through hole; and
   at least three first barcode patterns that are disposed on the first face, wherein the at least three first barcode patterns have an identical content.
2. The screw nut according to claim 1, wherein the at least three first barcode patterns are identical.
3. The screw nut according to claim 1, wherein the screw nut comprises three first barcode patterns that are disposed on the first face.

4. The screw nut according to claim 1, wherein the at least three first barcode patterns are arranged in a circumferentially non-overlapping relationship to each other on the first face.

5. The screw nut according to claim 1, wherein each of the at least three first barcode patterns has a ring-segment-shaped outline.

6. The screw nut according to claim 1, wherein the at least three first barcode patterns are equidistantly spaced from each other.

7. The screw nut according to claim 1, wherein the at least three first barcode patterns each span an angle of 120° or less around a longitudinal axis of the screw nut.

8. The screw nut according to claim 1, wherein the at least three first barcode patterns each comprise a two-dimensional barcode.

9. The screw nut according to claim 1, further comprising:
   a second face that surrounds the through hole; and
   at least three second barcode patterns that are disposed on the second face.

10. The screw nut according to claim 9, further comprising a drive surface, wherein the drive surface connects the first face with the second face.

11. A fastener arrangement, comprising:
    a threaded rod; and
    the screw nut according to claim 1, wherein the screw nut threadedly engages the threaded rod and wherein the first face of the screw nut surrounds the threaded rod.

\* \* \* \* \*